(12) United States Patent
Yu et al.

(10) Patent No.: US 11,951,865 B2
(45) Date of Patent: Apr. 9, 2024

(54) VEHICLE RECHARGE OF HOME ENERGY STORAGE

(71) Applicant: FORD GLOBAL TECHNOLOGIES, LLC, Dearborn, MI (US)

(72) Inventors: Lan Yu, Canton, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/986,291

(22) Filed: Nov. 14, 2022

(65) Prior Publication Data
US 2023/0073683 A1 Mar. 9, 2023

Related U.S. Application Data

(62) Division of application No. 17/018,213, filed on Sep. 11, 2020, now Pat. No. 11,524,601.

(51) Int. Cl.
| | |
|---|---|
| *B60L 55/00* | (2019.01) |
| *B60L 53/63* | (2019.01) |
| *B60L 53/66* | (2019.01) |
| *B60L 53/68* | (2019.01) |
| *H02J 3/32* | (2006.01) |

(52) U.S. Cl.
CPC .............. *B60L 55/00* (2019.02); *B60L 53/63* (2019.02); *B60L 53/66* (2019.02); *B60L 53/68* (2019.02); *H02J 3/322* (2020.01); *B60L 2240/72* (2013.01); *B60L 2260/32* (2013.01); *H02J 2310/12* (2020.01); *H02J 2310/60* (2020.01); *Y04S 10/126* (2013.01)

(58) Field of Classification Search
CPC .......... B60L 55/00; B60L 53/63; B60L 53/66; B60L 53/68; B60L 2240/72; H02J 3/322; H02J 2310/12; H02J 2310/60
See application file for complete search history.

(56) References Cited

U.S. PATENT DOCUMENTS

| | | | |
|---|---|---|---|
| 6,104,160 A | 8/2000 | Iwata et al. | |
| 8,581,545 B2 | 11/2013 | Obayashi et al. | |
| 2013/0046415 A1 | 2/2013 | Curtis et al. | |
| 2018/0157231 A1 | 6/2018 | Bogdan et al. | |
| 2018/0351363 A1 | 12/2018 | Kasberger et al. | |
| 2019/0016312 A1* | 1/2019 | Carlson | G05D 1/0088 |
| 2020/0036232 A1 | 1/2020 | Jones et al. | |
| 2020/0406771 A1* | 12/2020 | Okumura | H02J 3/381 |
| 2021/0273453 A1* | 9/2021 | Nishio | B60L 50/50 |

OTHER PUBLICATIONS

N. Z. Xu, K. W. Chan, C. Y. Chung and M. Niu, "Enhancing Adequacy of Isolated Systems With Electric Vehicle-Based Emergency Strategy," in IEEE Transactions on Intelligent Transportation Systems, vol. 21, No. 8, pp. 3469-3475, Aug. 2020, doi: 10.1109/TITS.2019.2929767. (Year: 2020).*

\* cited by examiner

*Primary Examiner* — Daniel Cavallari
(74) *Attorney, Agent, or Firm* — David B Kelley; Brooks Kushman P.C.

(57) ABSTRACT

A method for managing energy for a building includes connecting a power line of the building to a battery of a vehicle via a charger; responsive to occurrence of a power outage, supplying electric energy to the building from the battery and from an energy storage separate from the vehicle; and instructing the vehicle to recharge the battery and return to the building at a predefined time before stored energy of the energy storage falls below a predefined value.

5 Claims, 5 Drawing Sheets

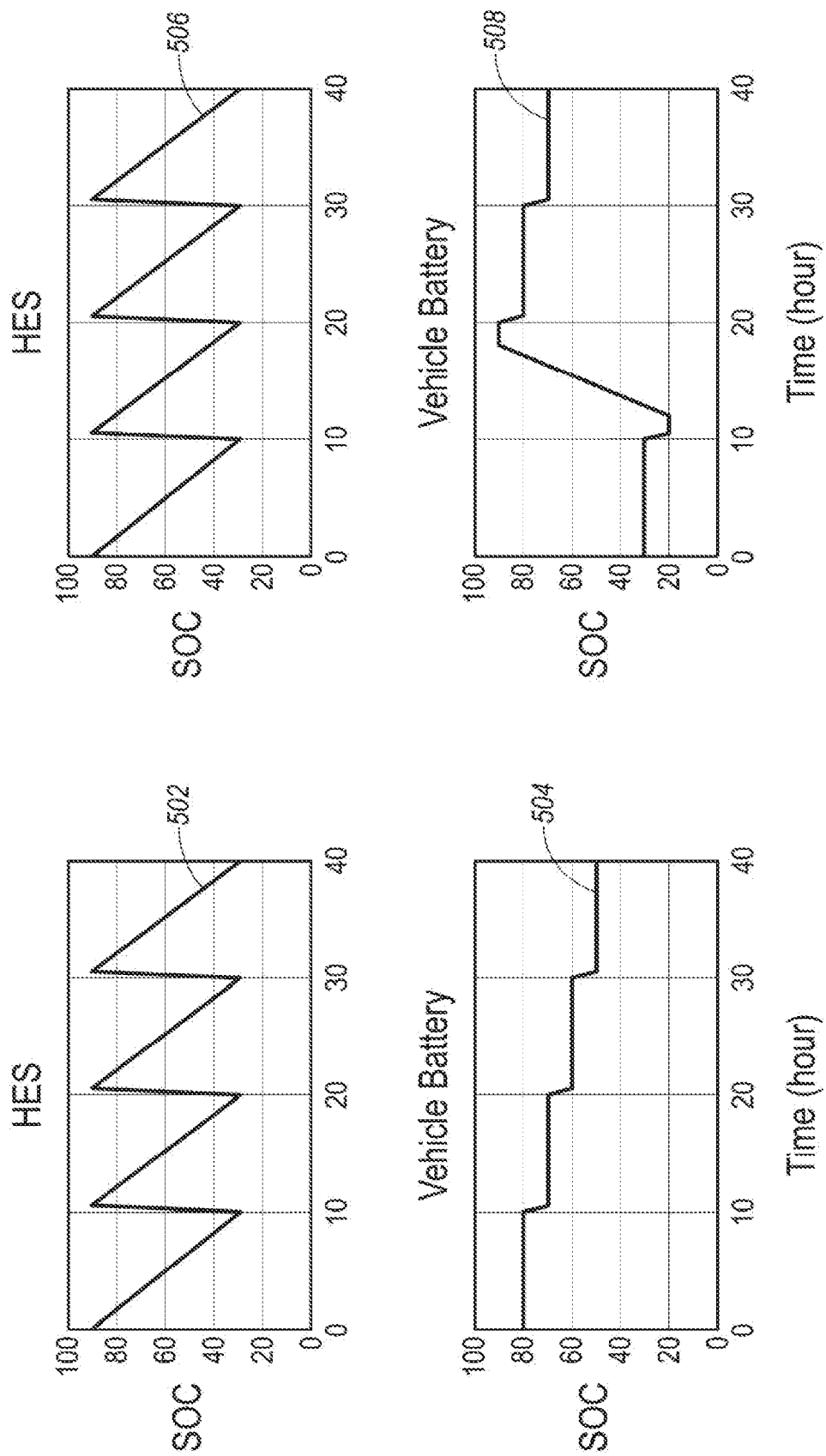

VEHICLE RECHARGE OF HOME ENERGY STORAGE

CROSS-REFERENCE TO RELATED APPLICATIONS

This application is a divisional of U.S. application Ser. No. 17/018,213, filed Sep. 11, 2020, now U.S. Pat. No. 11,524,601 issued Dec. 13, 2022, the disclosure of which is hereby incorporated in its entirety by reference herein.

TECHNICAL FIELD

The present disclosure relates to a home energy management system coordinated with an electric vehicle.

BACKGROUND

A home energy ecosystem (HEE) may include various components such as home energy storage (HES), electric vehicle, appliance, thermostat, solar panel and other devices operated and controlled via a home energy management system (HEMS). The HEMS may coordinate various components of the ecosystem to enhance convenience, increase efficiency and reduce energy cost. In case of a power outage (e.g. utility service upgrade), the HEMS may use energy stored in the HES to temporarily provide electric power to a household. However, due to the limited capacity of the HES, the HEMS may be unable to continuously power the household until the power restores.

SUMMARY

In one or more illustrative embodiments of the present disclosure, a system for managing energy of a building includes a controller in communication with a charger and configured to responsive to predicting (i) a coming power outage of an expected duration and (ii) a total energy reserve of a battery of a vehicle and an electric energy storage being less than an anticipated amount of energy to be used by the building during the expected duration, instruct the vehicle to recharge the battery at a target charge station and return before stored energy of the energy storage falls below a predefined value, and responsive to encountering the power outage, command the charger to supply electric energy to the building from the battery and electric energy storage.

In one or more illustrative embodiments of the present disclosure, a method for managing energy for a building includes connecting a power line of the building to a battery of a vehicle via a charger; responsive to occurrence of a power outage, supplying electric energy to the building from the battery and from an energy storage separate from the vehicle; and instructing the vehicle to recharge the battery and return to the building at a predefined time before stored energy of the energy storage falls below a predefined value.

In one or more illustrative embodiments of the present disclosure, an energy management system for a building includes a controller in communication with one or more electric consuming devices, an electric energy storage, and a charger configured to connect to an electric vehicle having a battery, wherein the controller is configured to, responsive to detecting a power outage and an energy reserve of the battery and energy storage being less than a predefined threshold, suspend power supply to the electric consuming devices classified as non-essential and continue to supply power to the electric consuming devices classified as essential.

BRIEF DESCRIPTION OF THE DRAWINGS

FIGS. 5A and 5B are waveform diagram of the HES and vehicle battery state of charge.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
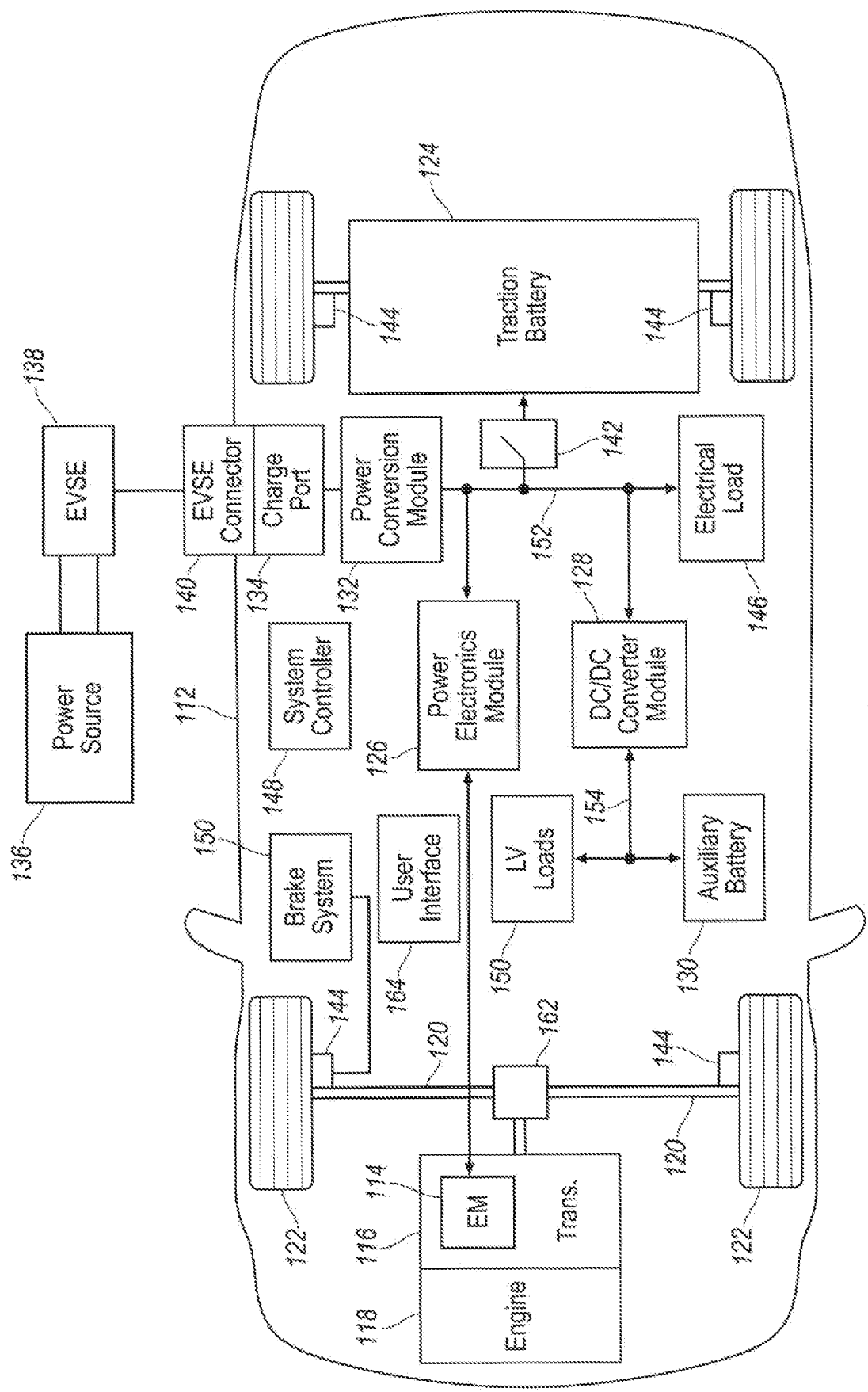
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a Battery Electric Vehicle (BEV). In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus/rail. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling. Additionally, the vehicle 112 may be configured to provide electric power from the traction battery 124 to off-board power storage (not shown) via the EVSE 138 and EVSE connection 140 under the control of controllers such as the power conversion module 132. Alternatively, the power transfer from the traction battery 124 to the off-board load (e.g. the HES) may be performed without utilizing the power conversion module 132 since both the traction battery 124 and the HES are DC power. The traction battery 124 may be directly connected to the charge port to transfer and/or receive DC power. For instance, the EVSE 138 may be integrated or associated with a home having a HES as power backup. The vehicle 112 may be operated as a portable power storage to transfer power from and to the HES coordinated by a HEMS (to be described in detail below).

One or more wheel brakes 144 may be provided for braking the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for slowing the vehicle. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
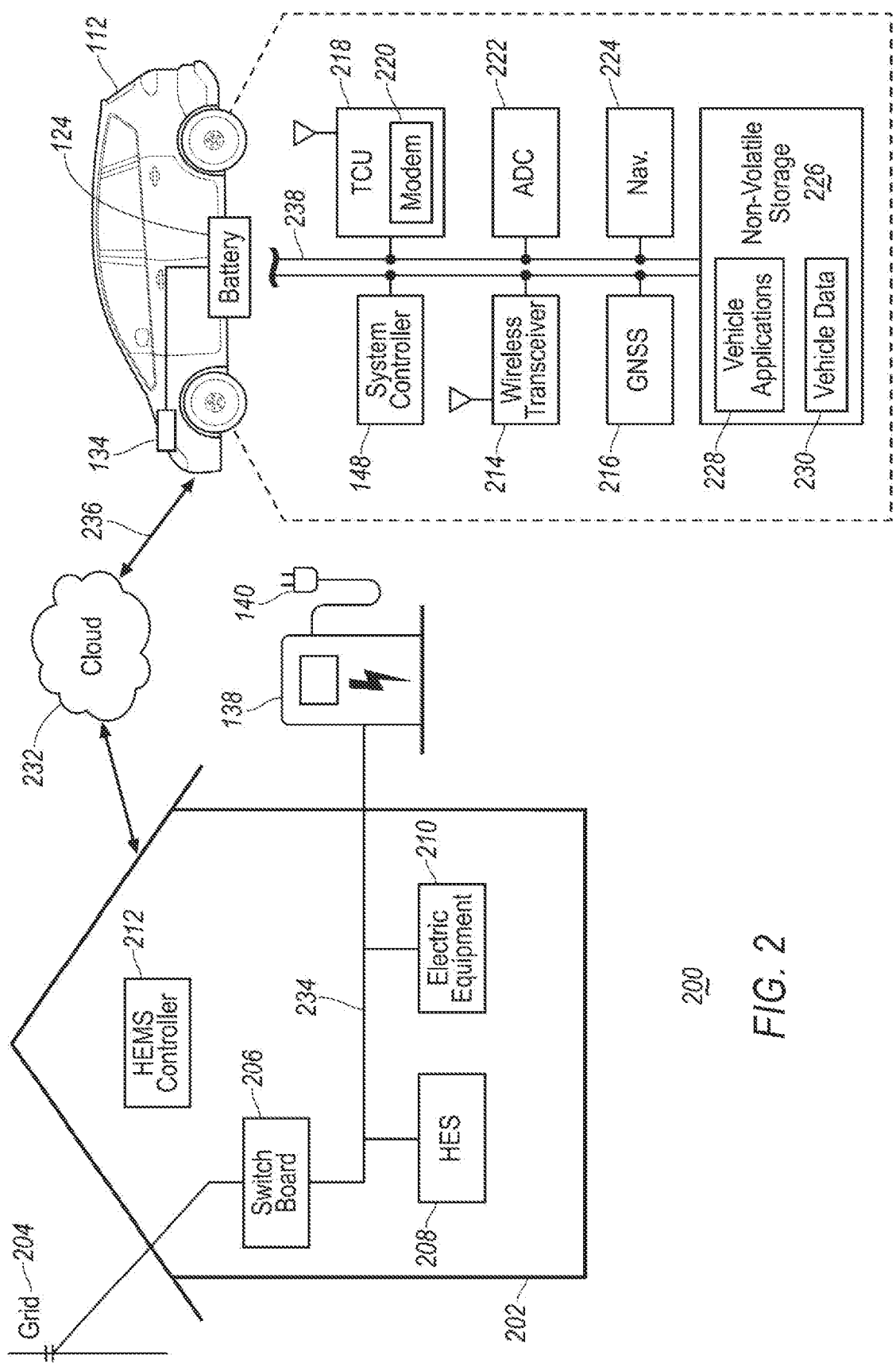
FIG. 2 is a diagram of a HEMS associated with an electric vehicle.

FIG. 2 depicts a diagram of a home energy management system associated with an electric vehicle. The HEE 200 in the present example may be implemented for a house 202. The house 202 may access electric power from a power grid 204 via a switch board 206 configured to provide various components of the HEE 200 with electric power via an internal powerline 234. For instance, the HEE 200 may include one or more electric equipment 210 (e.g. appliance) configured to consume electricity and provide various features to the household. The HEE 200 may further include a HES 208 configured to store electric energy. The HES 208 may be implemented in various forms. As an example, the HES 208 may include a rechargeable battery (e.g. lithium-ion battery) to store electric energy received from the grid 204 and to provide the electric energy to the internal powerline 234 whenever needed. Since the electric energy may be stored as DC power in the HES 208, one or more DC/AC inverters may be provided with the HES 208 for power transitions.

With continuing reference to FIG. 1, the internal power-line 234 may be further connected to an EVSE 138 configured to transfer electric energy with an electric vehicle 112. The EVSE 138 may be installed within or near the house 202 (e.g. in a garage) and adapted to a home electric energy configuration having a predefined voltage and maximum current supported by the switch board 206. As discussed with reference to FIG. 1, the EVSE 138 may be configured to connect to the vehicle 112 via the charge port 134 to charge the traction battery 124. Additionally, the EVSE 138 may be further configured to draw electric power from the traction battery 124 of the vehicle 112 to supply power to the HEE 200. For instance, in case of a power outage from the grid 204, the EVSE 138 may be configured to draw electric power from the vehicle 112 to power the components of the house 202. The power management of the HEE 200 may be controlled and coordinated by a HEMS controller 212 associated with house 202. The HEMS controller 212 may be implemented in various manners. For instance, the HEMS controller 212 may be a dedicated controller located within the house 202 and connected to components of the home energy ecosystem or smart home devices HEE 200 via wired or wireless connections (not shown). Alternatively, the HEMS controller 212 may be implemented by a desktop or laptop computer configured to run processes and programs to perform the controller operations. Alternatively, the HEMS controller 212 may be integrated with one or more components of the home energy ecosystem HEE 200 such as the EVSE 138. Alternatively, the HEMS controller 212 may be remotely implemented via a cloud server through the Internet and configured to monitor and control the operations of components of the home energy ecosystem HEE 200. In any or all of the above implementation examples, the HEMS controller 212 may be provided with software to monitor and control the operations of the various components of the home energy ecosystem HEE 200. The HEMS controller 212 may be further provided with an interface associated with input and output devices to interact with a user of the HEE 200. The HEMS 212 may be further connected to a cloud 232 via a public or private network to communicate with other entities such as the utility company and weather agencies to facilitate the planning and controlling of the HEE 200.

With continuing reference to FIG. 1, the vehicle 112 may further include various components to facilitate the power transaction between the battery 124 and the EVSE 138. The vehicle 112 may include a system controller 148 configured to perform instructions, commands and other routines in support of the processes described herein. For instance, the system controller 148 may include one or more processors and be configured to execute instructions of vehicle application 228 to provide features such as wireless communication and power management. Such instructions and other data may be maintained in a non-volatile manner using a variety of computer-readable storage medium 226. The computer-readable medium 226 (also referred to as a processor-readable medium or storage) may include any non-transitory medium (e.g. tangible medium) that participates in providing instructions or other data that may be used by the system controller 148. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The vehicle 112 may further provided with navigation and route planning features through a navigation controller 224 configured to calculate navigation routes responsive to user input via e.g. HMI controls (not shown) and output planned routes and instructions via an output device such as a speaker or a display (not shown). Location data that is needed for navigation may be collected from a global navigation satellite system (GNSS) controller 216 configured to communicate with multiple satellites and calculate the location of the vehicle 112. The GNSS controller 216 may be configured to support various current and/or future global or regional location systems such as global positioning system (GPS), Galileo, Beidou, Global Navigation Satellite System (GLONASS) and the like. Map data used for route planning may be stored in the storage 226 as a part of the vehicle data 230. Navigation software may be stored in the storage 226 as a part of the vehicle applications 228.

The vehicle 112 may be further configured to wirelessly communicate with a variety of digital entities via a wireless transceiver 214. For instance, the vehicle 112 may be configured to communicate with the HEMS controller 212 via the wireless transceiver 214 to perform various operations. Additionally or alternatively, the communication between the vehicle 112 and the HEMS controller may be enabled by the EVSE connector 140 coupled with the charge port 134 configured to support digital communication protocols. The wireless transceiver may be configured to support a variety of wireless communication protocols enabled by wireless controllers (not shown) in communication with the wireless transceiver 214. As a few non-limiting examples, the wireless controllers may include a Wi-Fi controller, a Bluetooth controller, a radio-frequency identification (RFID) controller, a near-field communication (NFC) controller, and other devices such as a Zigbee transceiver, an IrDA transceiver, an ultra-wide band (UWB) transceiver, or the like.

The vehicle 112 may be further provided with a telematics control unit (TCU) 218 configured to control telecommunication between the vehicle 112 and the cloud 232 through a wireless connection 236 using a modem 220. The wireless connection 236 may be in the form of various communication network e.g. cellular network. Through the wireless connection 236, the vehicle 112 may access one or more servers of the cloud 232 to access various content for various purposes. The vehicle 112 may be further provided with autonomous driving features via an autonomous driving controller (ADC) 222. The ADC 222 may be configured to perform autonomous driving for the vehicle 112 in conjunction with the navigation controller 224 using map data stored in the storage 226 and live data from the cloud 232. It is noted that the term cloud is used as a general term in the present disclosure and may include any computing network involving carriers, router, computers, servers, or the like configured to store data and perform data processing functions and facilitate communication between various entities.

The various components of the vehicle 112 introduced above may be connected to each other via in-vehicle network 238. The in-vehicle network 238 may include, but is not limited to, one or more of a controller area network (CAN), an Ethernet network, and a media-oriented system transport (MOST), as some examples.

Figure 3:
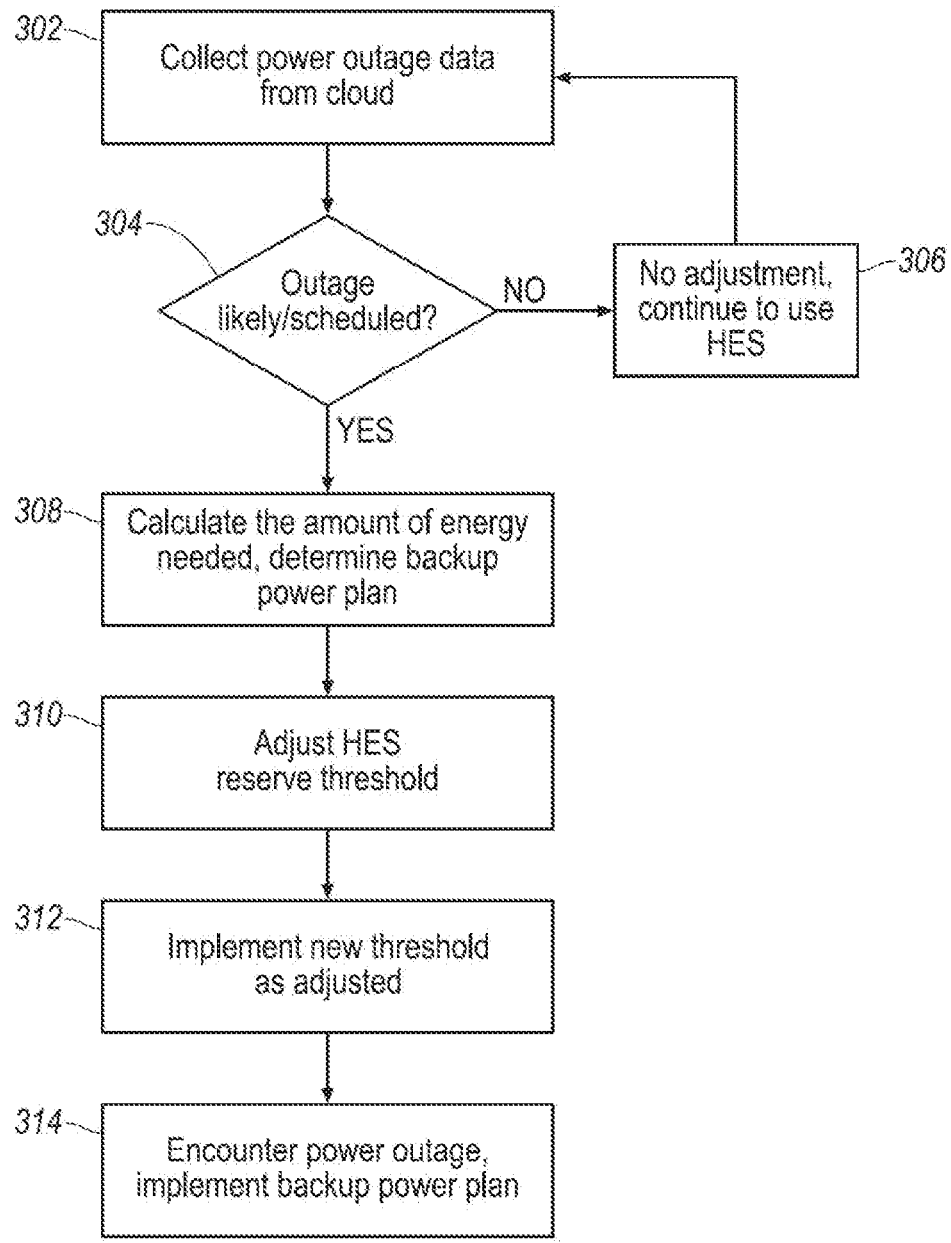
FIG. 3 is a flow diagram for a process of the HEMS.

Referring to FIG. 3, an example flow diagram for a process 300 of the HEMS is illustrated. With continuing reference to FIGS. 1 and 2, the process 300 may be implemented via the HEMS controller 212 of the home energy ecosystem HEE 200. At operation 302, the HEMS controller 212 collects data related to an anticipated (e.g. scheduled or predicted) power outage from the grid 204. The data relevant to the anticipated power outage may be predefined by the system. As a few non-limiting examples, data relevant to the power outage may include weather forecast received from the cloud 232, utility planned maintenance received from the cloud 232, user input via the interface of the HMI controller 212, season of the year, current and predicted electrical loads on local and regional distribution and transmission system received from the cloud 232, and government announcements received from the cloud 232. With the data received, the HEMS controller 212 may determine any scheduled outage. Additionally, the HEMS controller 212 may analyze the data to predict a power outage. For instance, HEMS controller 212 may calculate an outage probability based on weather forecast or electrical loads and compare the probability with a predetermined threshold (e.g. 50%) to predict if an outage is likely. At operation 304, if the HEMS controller 212 determines no outage is likely to happen, the process proceeds to operation 306 and the HEMS controller 212 keeps a current power plan unchanged and may continue to use energy from the HES 208.

Otherwise, if the HEMS controller 212 determines a scheduled or predicted power outage is likely, the process proceeds to operation 308 and the HEMS controller 212 calculates how much energy reservation is needed based on the length of the outage and power consumption of the home 202. For instance, the HEMS controller 212 may obtain the length of outage based on a planned maintenance schedule (e.g. one hour). Alternatively, the HEMS controller 212 may predict the length of the power outage using the data received at previous operations. Since the prediction depends on various moving factors, the predicted duration may be less accurate compared with the outage schedule from the utility company or government. However, a duration prediction may still be useful to provide an approximate estimation for backup power supply planning in advance. The HEMS controller 212 may obtain the power consumption by evaluating a power rating of the electric equipment 210 and a present power output at the switch board 206. For instance, the HEMS controller may communicate with one or more electric equipment 210 to determine their average or current power consumption via wired or wireless connections. Alternatively, HEMS controller 212 may be configured to determine a power plan for backup supply mode to implement during the power outage to reduce and limit certain unnecessary power output. For instance, during a power outage, the HEMS controller 212 may use backup/reserved energy from the HES 208 to supply the home 202. The HEMS controller 212 may suspend power output to the EVSE 138 and/or some predefined non-essential electric equipment 210 to prolong the time of backup supply. Based on the scheduled/predicted outage length, the HEMS 212 may dynamically adjust the backup power plan to decide to continue or suspend power supply to the electric power equipment. For instance, for a short power outage anticipated, the HEMS controller may be configured to only suspend power supply to the EVSE 138 while continuing to supply power from the HES 208 to all other equipment 210 of the home 202 as normal. With an increased length of the power outage, the HEMS controller 212 may decide to suspend power supply to other predefined equipment 210 classified as non-essential such as game console, music player, garden light or the like.

Additionally, at operation 310, the HEMS controller 212 calculates a power reserve threshold for the HES 208 based on the backup power supply plan in anticipation for the power outage. For instance, the HES reserve threshold may be set to 30% in a normal condition without the anticipated power outage. Responsive to the anticipated power outage, the HEMS controller 212 may calculate and increase the HES reserve threshold to 90%. There may be various reasons for a low initial HES reserve threshold. As an example, the utility company providing electricity may apply flexible pricing for the area covering the house 202. The rate may be high during normal hours (e.g. 7 AM to 11 PM) and low during afterhours (e.g. 11 PM to 7 AM). The HEMS controller 212 may recharge the HES 208 during afterhours when the rate is low and use the HES 208 to supply power to the HEE 200 during normal hours to save cost. At operation 312, the HEMS controller 212 implements the new threshold as calculated to the HES 208. At operation 314, responsive to encountering the power outage as anticipated, the HEMS controller 212 implements the backup power supply plan determined at operation 308 to supply electric power from the HES 208 to essential equipment 210 (such as sump pump, appliance, telephone, internet router or the like) of the HEE 200.

As an alternative example, the process 300 illustrated in FIG. 3 may be simplified and applied to a situation in which the power outage is not anticipatable. For instance, the power outage may occur without any prior notice. Responsive to the outage, The HEMS controller 212 may switch to the backup mode and supply power to the HEE 200 from the HES 208 and/or the vehicle 112. The HEMS controller 212 may prioritize to use the traction battery 124 first to leave sufficient power storage in the HES 208. Responsive to the total energy storage of both the HES 208 and the traction battery 124 dropping below a predefined threshold and the power outage continuing, the HEMS 212 may instruct the vehicle 112 to recharge the traction battery 124 and return to the house 202 before the HES 208 runs out. In case that the vehicle 112 is provided with autonomous driving features, autonomous driving instructions may be provided. The HMS controller 212 may repeat the process until the power is restored.

Figure 4:
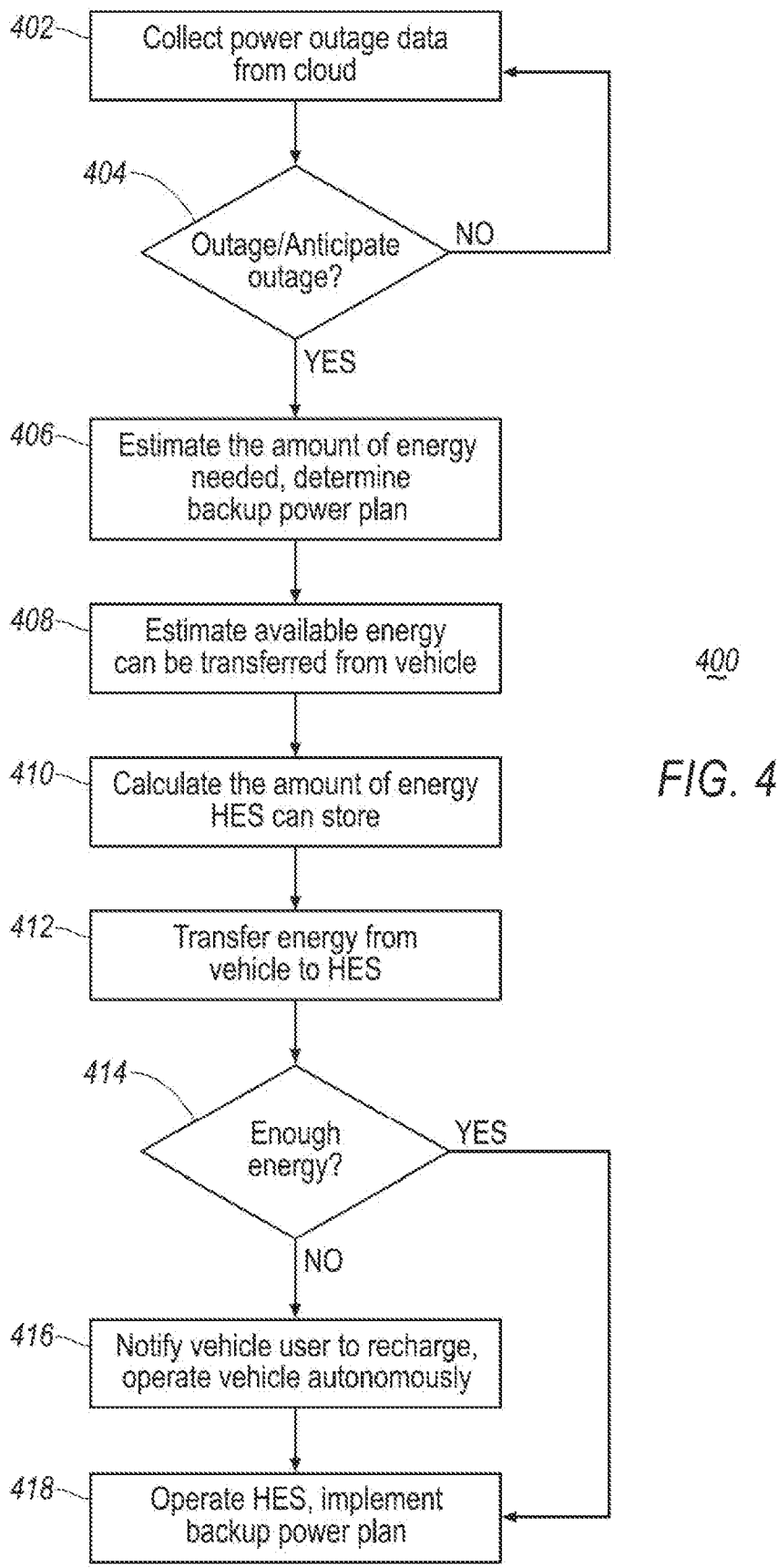
FIG. 4 is a flow diagram for another process of the HEMS.

Referring to FIG. 4, a flow diagram for a process 400 of the HEMS of another embodiment of the present disclosure is illustrated. Different from the process 300 illustrated with reference to FIG. 3, in the present example, the electric vehicle 112 is involved in the backup power planning. With continuing reference to FIGS. 1 to 3, the process 400 described herein may be implemented via the HEMS controller 212 individually, or in conjunction with the system controller 148. Alternatively, the system controller 148 of the vehicle 112 may be configured to perform any or all of operations of the process 400. For simplicity, the following description will be made with reference to the HEMS controller 212 alone. At operation 402, the HEMS controller 212 collects data relevant to the power outage similar to the operation performed at 302. At operation 404, the HEMS controller 212 determines if a power outage has occurred or is anticipated. If the answer is no, the process returns to operation 402. If the answer is yes, the process proceeds to operation 406 and the HEMS controller 212 estimates the amount of energy needed during the outage and determines the backup power supply plan which is similar to the operation performed at operation 308 of the process 300. At operation 408, the HEMS controller 212 estimates an available energy that can be transferred from the vehicle to the HES 208 via the EVSE 138. The available amount of energy from the vehicle 112 may be estimated via the current state of charge (SOC), and/or the amount of energy of the traction battery 124. In case the vehicle is being used when the estimation is performed, the HEMS controller 212 may calculate an estimated SOC upon arriving at the house using a current location and route of the vehicle 112 received from the cloud 232 and calculate the available energy using the estimated SOC or energy amount to provide an approximate estimation. At operation 410, the HEMS controller 212 calculates the amount of energy that the HES 208 is able to store to provide the backup power supply during the outage. In case the HES 208 is not fully charged, at operation 412, the HEMS controller 212 coordinates an energy transfer from the traction battery 124 to the HES 208 via the EVSE 138.

At operation 414, the HEMS controller 212 determines if the energy stored in both the HES 208 and the vehicle battery 124 is enough to last through the duration of the power outage as anticipated. If the answer is yes, the process proceeds to operation 418 and the HEMS controller 212 operates the HES 208 to provide backup power supply to the HEE 200 during the outage implementing the backup power plan calculated at operation 406. However, if the answer at operation 414 is no, the process proceeds to operation 416. The HEMS controller 212 notifies the vehicle user about the insufficient battery charge and instructs the user to recharge the vehicle and return to the house 202 before the HES 208 runs out as calculated. The instructions provided by the HEMS controller 212 may include a location of the charging station that is not affected by the power outage. The instructions may further include a time to start to drive to the charging station calculated to optimize the backup power plan. In case the target charging station accepts reservation, the HEMS controller 212 may further place a reservation with the target charging station at an estimated time of arrival to maximize the chance that the vehicle 112 can be charged in time. In case that the vehicle 112 is provided with autonomous driving features, the instructions may further include driving instructions for the ADC 222 to direct the vehicle 112 to drive to the target charging station autonomously. If the vehicle 112 is not currently at home and the battery 124 has capacity to accommodate more charges, the HEMS controller 212 may instruction the vehicle 112 to stop by the target charging station before coming home.

Referring to FIGS. 5A and 5B, SOC waveform diagrams for the HES 208 and vehicle battery 124 of embodiments of the present disclosure are illustrated. With continuing reference to FIGS. 1 to 4, FIG. 5A illustrates waveform diagrams for an embodiment that the vehicle battery is sufficient and does not need a recharge during the backup power mode ("Yes" for operation 414 of FIG. 4), whereas FIG. 5B illustrates waveform diagrams for an embodiment that the vehicle 112 drives to the target charging station and is recharged during the backup power mode ("No" for operation 414 of FIG. 4). Referring to FIG. 5A, the HES 208 starts to discharge responsive to encountering the power outage a time 0. As illustrated by way of the waveform 502, during the discharges the SOC of the HES 208 reduces from 90% at time 0 to 30% at time 10 hours when the vehicle 112 starts to recharge the HES 208 to 90% SOC under the control of the HEMS controller 212 (and/or the system controller 148 of the vehicle 112). As illustrated in the corresponding waveform 504 for the vehicle battery 124, the SOC of the battery 124 maintains at 80% from time 0 to 10 hours during which no power is drawn from the battery 124. At around the 10 hour time point, the vehicle battery 124 starts to supply power to charge the HES 208 and reduces to approximately 70% after the first vehicle battery discharge completes. The HES/vehicle battery charge/discharge process repeats according to the backup power plan calculated by the HEMS controller 212 until the power supply from the grid 204 resumes.

FIG. 5B illustrates an alternative HES/vehicle battery power supply process. In this example, the HEMS controller 212 determines the SOC of the HES 208 and vehicle battery 124 may be insufficient to last through the power outage and command the vehicle 112 to recharge the battery 124 to provide further supply to the HEMS power backup. The waveform 506 for the HES 208 is generally the same as in FIG. 5A. However, responsive to the vehicle battery 124 reducing to 20% SOC after the first discharge, the vehicle is driven to the target charging station for a recharge as planned. As illustrated in waveform 508, the SOC of the vehicle battery 124 increases from 20% to approximately 90% during the recharge and the vehicle 112 returns to the house 202 for a second discharge to continue to supply power to the HEE 200.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for managing energy for a building, comprising:
    connecting a power line of the building to a battery of a vehicle via a charger;
    predicting a power outage and a corresponding duration using data from a cloud server;
    monitoring power consumption of one or more devices of the building;
    calculating an amount of energy needed for the building for the corresponding duration based on the power consumption;
    comparing the amount with a total available energy reserve determined using available energy of both the battery and an energy storage separate from the vehicle;
    responsive to occurrence of the power outage, supplying electric energy to the building from the battery and from the energy storage; and
    instructing the vehicle to recharge the battery at a location other than the building and then return to the building at a predefined time before stored energy of the energy storage falls below a predefined value.

2. The method of claim 1, further comprising responsive to detecting the vehicle is away from the building, calculating the available energy of the battery based on a current amount of energy stored by the battery and a planned route for the vehicle to drive to the building.

3. The method of claim 1, further comprising providing instructions to the vehicle to permit the vehicle to autonomously drive to and from a target charging station for the recharge.

4. The method of claim 3, further comprising placing a reservation at the target charging station.

5. The method of claim 1, further comprising responsive to occurrence of the power outage, suspending power supply to consumers classified as non-essential and continuing power supply to consumers classified as essential.

* * * * *